(12) United States Patent
Zheng et al.

(10) Patent No.: US 11,657,249 B2
(45) Date of Patent: May 23, 2023

(54) IDENTIFICATION CARD WITH A GLASS SUBSTRATE, IDENTIFICATION CARD WITH A CERAMIC SUBSTRATE AND MANUFACTURING METHODS THEREOF

(71) Applicant: GIESECKE+DEVRIENT MOBILE SECURITY GMBH, Munich (DE)

(72) Inventors: Xiang Zheng, Hubei (CN); Chen Fang, Hubei (CN); Wensheng Zhu, Hubei (CN); Dunpu Wang, Hubei (CN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 17/312,216

(22) PCT Filed: Dec. 9, 2019

(86) PCT No.: PCT/CN2019/124058
§ 371 (c)(1),
(2) Date: Jun. 9, 2021

(87) PCT Pub. No.: WO2020/119643
PCT Pub. Date: Jun. 18, 2020

(65) Prior Publication Data
US 2022/0051067 A1    Feb. 17, 2022

(30) Foreign Application Priority Data

Dec. 11, 2018 (CN) .......................... 201811511880.3
Dec. 11, 2018 (CN) .......................... 201811513388.X

(51) Int. Cl.
*G06K 19/06* (2006.01)
*G06K 19/077* (2006.01)

(52) U.S. Cl.
CPC .............................. *G06K 19/07722* (2013.01)

(58) Field of Classification Search
CPC .. G06K 1/00; G06K 3/00; G06K 7/00; G06K 15/00; B41M 5/267; B41M 5/38214;
(Continued)

(56) References Cited

U.S. PATENT DOCUMENTS

| 4,962,415 A | * | 10/1990 | Yamamoto | .......... | H01L 23/5388 |
|---|---|---|---|---|---|
| | | | | | 235/487 |
| 5,549,953 A | * | 8/1996 | Li | .......... | G07D 7/004 |
| | | | | | 428/64.2 |

(Continued)

FOREIGN PATENT DOCUMENTS

| CN | 201773418 U | 3/2011 |
|---|---|---|
| CN | 102156902 A | 8/2011 |

(Continued)

OTHER PUBLICATIONS

International Search Report with Written Opinion from PCT Application No. PCT/CN2019/124058, dated Mar. 6, 2020.

*Primary Examiner* — Daniel St Cyr
(74) *Attorney, Agent, or Firm* — Workman Nydegger

(57) ABSTRACT

The identification card includes a glass substrate provided with first and second surfaces facing opposite directions. The first surface of the glass substrate is provided with at least one first recess, and the identification card includes a first resin material layer filled in the first recess; and at least one of a first information storage medium, a first security feature, and a first decorative feature bonded to the first resin material layer. In a variation, an identification card has a ceramic substrate with first and second surfaces facing in opposite directions. The first surface of the ceramic substrate is provided with at least one first recess, and the identification card includes a first resin material layer filled in the first recess(es); and at least one of a first information storage (Continued)

medium, a first security feature, and a first decorative feature bonded to the first resin material layer.

14 Claims, 2 Drawing Sheets

(58) Field of Classification Search
CPC ....... H01L 2924/14; H01L 2924/16225; H01L 2924/15787
USPC .................................................. 235/492, 487
See application file for complete search history.

(56) References Cited

U.S. PATENT DOCUMENTS

| | | | | |
|---|---|---|---|---|
| 6,073,829 | A * | 6/2000 | Pienimaa | H01L 24/81 |
| | | | | 228/123.1 |
| 6,114,240 | A * | 9/2000 | Akram | H01L 25/105 |
| | | | | 257/E21.597 |
| 8,033,457 | B2 * | 10/2011 | Varga | G06K 19/06196 |
| | | | | 235/492 |
| 8,087,608 | B2 * | 1/2012 | Combes | B64D 27/26 |
| | | | | 244/54 |
| 2004/0178491 | A1 * | 9/2004 | Akram | H01L 21/486 |
| | | | | 257/E21.597 |
| 2006/0060636 | A1 * | 3/2006 | Daves | H05K 3/303 |
| | | | | 228/180.22 |
| 2013/0248607 | A1 * | 9/2013 | Zlotnik | B42D 25/00 |
| | | | | 156/60 |
| 2017/0316300 | A1 * | 11/2017 | Herslow | B32B 21/14 |

FOREIGN PATENT DOCUMENTS

| | | |
|---|---|---|
| CN | 205139969 U | 4/2016 |
| CN | 205540852 U | 8/2016 |
| CN | 109447206 A | 3/2019 |
| CN | 109447207 A | 3/2019 |
| CN | 209182855 U | 7/2019 |
| CN | 209182856 U | 7/2019 |
| WO | 2016073473 A1 | 5/2016 |

* cited by examiner

IDENTIFICATION CARD WITH A GLASS SUBSTRATE, IDENTIFICATION CARD WITH A CERAMIC SUBSTRATE AND MANUFACTURING METHODS THEREOF

CROSS-REFERENCE TO RELATED APPLICATION

This application claims the benefits of Chinese Applications No. 201811513388.X, filed Dec. 11, 2018 and No. 201811511880.3, filed Dec. 11, 2018, which are incorporated by reference in their entireties.

TECHNICAL FIELD

The present invention relates generally to the field of identification cards, and in particular to an identification card with a glass substrate, an identification card with a ceramic substrate and the manufacturing methods thereof.

BACKGROUND

An identification card is a medium for identifying individuals and storing individual information. Various identification cards (for example, work permit cards, ID cards, financial transaction cards, membership cards, etc.) have been widely used in people's lives.

The current identification cards are mostly made by using a polymer material to manufacture a card body or one or more layers of the card body, and then forming desired graphic information on the card body or the card body layer by printing, and then adding (embedding, pasting) various information storage media and security protection components on the card body.

However, the polymer material has low strength and is inferior in high temperature resistance and chemical resistance. Among the materials used in the identification cards on the market, PVC (polyvinyl chloride) accounts for more than 90%. Such card is easily deformed and easily broken, resulting in the failure of the card body. In addition, the surface graphic on the polymer material card body is realized by printing, which may cause fading under the influence of external light, temperature and the like.

In addition, as identification cards (e.g., various credit cards) gradually penetrate people's lives and users' pursuit of personality quality, various special materials and personalized features are gradually applied to the identification cards. For example, financial transaction cards, business cards, and the like having characteristics of wooden materials, silk materials, and metallic materials have appeared.

A glass material is an amorphous inorganic non-metal material. Compared with polymer materials, it has advantages of high melting point, high hardness, high wear resistance and oxidation resistance. In particular, in recent years, various glass materials and glass-based composite materials have been developed, which overcome a problem of large brittleness of ordinary glass and further improve various physical properties of glass materials. Ceramic material refers to a class of inorganic materials that are formed by forming and sintering at high temperatures using natural or synthetic compounds. It has advantages of high melting point, high hardness, high wear resistance and oxidation resistance.

A known card is a transaction card having a monolithic ceramic card body including one or more pockets, and at least one of a magnetic stripe, a barcode, and a laser signature portion. Another known card is a portable data carrier which comprises a plastic body, and a ceramic layer is arranged on at least one side of the plastic body.

Although ceramic materials have been proposed in the field of identification cards, the following problems still exist:

1. The ceramic material is mostly formed as a layer or a part of the card body, and is bonded to the card base material. Therefore, when the card base material is deformed by force, the ceramic material layer and the card base material layer are easily separated;

2. Second, the bonding is poor when the chip, magnetic strip, anti-counterfeit label, etc. are directly pasted onto the ceramic material.

Another known card is a glass-containing transaction card comprising a substantially planar sheet having a front and back surfaces bounded by a continuous peripheral edge and a recordable medium for storing information relating to a transaction account, and the glass-containing transaction card has at least one layer of alkali-aluminosilicate glass.

Although glass materials have been proposed in the field of identification cards, the following problems still exist:

1. The glass material is mostly formed as a layer or a part of the card body, and is bonded to the card base material. Therefore, when the card base material is deformed by force, the glass material layer and the card base material layer are easily separated;

2. Second, the bonding is poor when the chip, magnetic strip, anti-counterfeit label, etc. are directly pasted onto the glass material.

SUMMARY

An object of the present invention is to provide an identification card with a glass substrate to solve at least one of the above-mentioned problems in the prior art.

According to one aspect of the invention, an identification card with a glass substrate is provided.

According to an exemplary embodiment, the identification card may include a glass substrate having a first surface and a second surface facing in opposite directions. The first surface of the glass substrate has at least one first recess; and the identification card further includes: a first resin material layer filled in the first recess(es); and at least one of a first information storage medium, a first security feature, and a first decorative feature bonded to the first resin material layer.

According to another exemplary embodiment, the glass substrate may include a silicate glass, a borate glass, a phosphate glass or a glass composite.

According to still another exemplary embodiment, the first resin material layer may include at least one of PET, PVC, ABS, PP, and PE, and the first information storage medium may include at least one of a contact IC chip, a non-contact IC chip, a magnetic strip, and a signature strip.

According to still another exemplary embodiment, the second surface of the glass substrate may have at least one second recess, and the identification card further includes: a second resin material layer filled in the second recess(es); and at least one of a second information storage medium, a second security feature, and a second decorative feature bonded to the second resin material layer.

According to still another exemplary embodiment, the second resin material layer may include at least one of PET, PVC, ABS, PP, and PE, and the second information storage medium may include at least one of a contact IC chip, non-contact IC chip, a magnetic strip, and a signature strip.

According to another aspect of the present invention, a method of manufacturing an identification card with a glass substrate is provided.

According to an exemplary embodiment, the method may include: fabricating a glass substrate with a first and a second surfaces facing in opposite directions, and the first surface of the glass substrate having at least one first recess; forming a first resin material layer in the first recess(es); and bonding at least one of a first information storage medium, a first security feature, and a first decorative feature to the first resin material layer.

According to another exemplary embodiment, the glass substrate may include a silicate glass, a borate glass, a phosphate glass or a glass composite.

According to still another exemplary embodiment, the first resin material layer may include at least one of PET, PVC, ABS, PP, and PE, and the first information storage medium may include at least one of a contact IC chip, a non-contact IC chip, a magnetic strip, and a signature strip.

According to still another exemplary embodiment, the second surface of the glass substrate may have at least one second recess, and the method further includes: forming a second resin material layer in the second recess(es); and bonding at least one of a second information storage medium, a second security feature, and a second decorative feature to the second resin material layer.

According to still another exemplary embodiment, the second resin material layer may include at least one of PET, PVC, ABS, PP, and PE, and the second information storage medium includes at least one of a contact IC chip, a non-contact IC chip, a magnetic strip, and a signature strip.

An object of the present invention is to provide an identification card with a ceramic substrate to solve at least one of the above-mentioned problems in the prior art.

According to one aspect of the invention, an identification card with a ceramic substrate is provided.

According to an exemplary embodiment, the identification card may include a ceramic substrate having a first surface and a second surface facing in opposite directions. The first surface of the ceramic substrate has at least one first recess; and the identification card further includes: a first resin material layer filled in the first recess(es); and at least one of a first information storage medium, a first security feature, and a first decorative feature bonded to the first resin material layer.

According to another exemplary embodiment, the ceramic substrate may include at least one of a metal oxide, a metal carbide, a metal boride, a metal nitride, and a metal silicide.

According to still another exemplary embodiment, the first resin material layer may include at least one of PET, PVC, ABS, PP, and PE, and the first information storage medium may include at least one of a contact IC chip, a non-contact IC chip, a magnetic strip, and a signature strip.

According to still another exemplary embodiment, the second surface of the ceramic substrate may have at least one second recess, and the identification card further includes: a second resin material layer filled in the second recess(es); and at least one of a second information storage medium, a second security feature, and a second decorative feature bonded to the second resin material layer.

According to still another exemplary embodiment, the second resin material layer may include at least one of PET, PVC, ABS, PP, and PE, and the second information storage medium may include at least one of a contact IC chip, non-contact IC chip, a magnetic strip, and a signature strip.

According to another aspect of the present invention, a method of manufacturing an identification card with a ceramic substrate is provided.

According to an exemplary embodiment, a method of manufacturing an identification card with a ceramic substrate may include: fabricating a ceramic substrate with a first and a second surfaces facing in opposite directions, and the first surface of the ceramic substrate having at least one first recess; forming a first resin material layer in the first recess(es); and bonding at least one of a first information storage medium, a first security feature, and a first decorative feature to the first resin material layer.

According to another exemplary embodiment, the ceramic substrate may include at least one of a metal oxide, a metal carbide, a metal boride, a metal nitride, and a metal silicide.

According to still another exemplary embodiment, the first resin material layer may include at least one of PET, PVC, ABS, PP, and PE, and the first information storage medium may include at least one of a contact IC chip, a non-contact IC chip, a magnetic strip, and a signature strip.

According to still another exemplary embodiment, the second surface of the ceramic substrate may have at least one second recess, and the method further includes: forming a second resin material layer in the second recess(es); and bonding at least one of a second information storage medium, a second security feature, and a second decorative feature to the second resin material layer.

According to still another exemplary embodiment, the second resin material layer may include at least one of PET, PVC, ABS, PP, and PE, and the second information storage medium includes at least one of a contact IC chip, a non-contact IC chip, a magnetic strip, and a signature strip.

BRIEF DESCRIPTION OF THE DRAWINGS

Other objects and advantages of the present invention will become apparent from the Detailed Description of the present invention with reference to the accompanying drawings.

DETAILED DESCRIPTION

The technical solutions of the present invention will be further described in detail below with reference to the accompanying drawings and exemplary embodiments, such that the objects, technical solutions and advantages of the present invention will be more easily understood. It should be noted that the present invention is not limited to the configurations or details set forth below or illustrated in the accompanying drawings. The invention may also have other embodiments or be otherwise implemented.

It should be understood that the terms "comprise", "contain", and "have" used in the present specification do not exclude other elements or steps, and the directional terms used herein, for example "left", "right", "up", "below" and the like, are merely used to indicate the position or direction of the corresponding features in the accompanying drawings for ease of illustration and understanding, and should not be explained to be limitation to the structure of the present invention. In addition, the technical feature prefixes "first", "second", "third", "fourth" and the like used in the present application document are only used to distinguish different similar technical features, and do not attempt to make additional restrictions on the respective technical features.

It should be noted that the "provided by stacking layers sequentially" or similar expressions used herein merely indicate the order of stacking the respective layers, and are not intended to limit the direct adjacency between the layers, unless otherwise explicitly stated or recited, the situation where other layers are additionally provided between these layers is also included.

Figure 1:
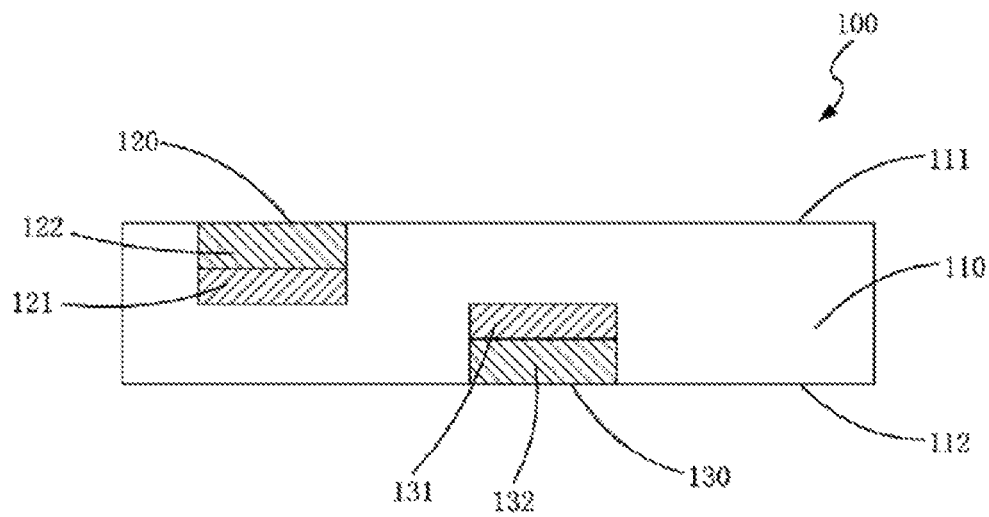
FIG. 1 is a schematic cross-sectional view of an identification card with a glass substrate in accordance with an exemplary embodiment of the present invention.

In the following description, similar members (layers) of the card body in the respective embodiments have similar reference numerals, and the description about the respective components in the first embodiment is equally applicable to other embodiments, unless otherwise stated, and therefore, it is omitted when describing other embodiments. The size ratios in the drawings of the specification of the present application do not represent the true size ratios of the products, but merely for the purpose of schematically presenting the positional relationship or the connection relationship between the respective components. For ease of understanding, the size of the components may be scaled up or down in different proportions FIG. 1 is a schematic cross-sectional view of an identification card with a glass substrate in accordance with an exemplary embodiment of the present invention. As shown in FIG. 1, the identification card 100 includes a glass substrate 110, and the glass substrate 110 has a first surface 111 (e.g., a front side of the identification card) and a second surface 112 (e.g., the back side of the identification card) facing in opposite directions. At least one first recess 120 is formed on the first surface 111 of the glass substrate 110, and the identification card 100 further includes a first resin material layer 121 filled in the first recess(es) 120 and at least one feature 122 of a first information storage medium, a first security feature, and a first decorative feature bonded to the first resin material layer.

In an exemplary embodiment, the glass substrate 110 may be made by selecting any glass material having suitable strength. For example, a silicate glass, a borate glass, a phosphate glass, and the like having a suitable strength. The glass substrate 110 may also be made of a suitably treated glass material for better physical properties (e.g., a tempered glass). Further, the glass substrate 110 may be made of a glass-based composite material. An appropriate amount of other components may also be incorporated into the glass substrate 110 to impart a desired color, light transmittance, and/or infrared transmittance to the glass substrate 110. For example, the addition of dichromate or iron oxide into the glass material may make the glass gray and absorb ultraviolet light and part of visible light; and the incorporation of nickel oxide and ferrous oxide may make the glass blue-green, and absorb infrared rays and part of visible light. Such identification card card has advantages of high melting point, high hardness, high wear resistance and oxidation resistance.

The glass substrate 110 can be made by melting a glass raw material at a high temperature and then injecting it into a suitable mold for casting. The first recess(es) 120 on the surface of the glass substrate 110 may be formed while manufacturing the glass substrate 110 by using a suitable casting mold. Furthermore, the first recess may also be obtained by machining after forming the glass substrate.

In an exemplary embodiment, the first resin material layer 121 may be formed of at least one of various commonly used resin materials, for example, polyethylene terephthalate (PET), polyvinyl chloride (PVC), acrylonitrile-butadiene-styrene copolymer (ABS), polypropylene (PP), polyethylene (PE), and the like. According to an exemplary embodiment, after the glass substrate 110 is completed, the resin material may be injected into the first recess(es) 120 of the glass substrate 110 in a molten state, and then be cooled to form a first resin material layer 121. An exemplary method of forming the first resin material layer 121 includes 3D printing. The height of the first resin material layer 121 may be substantially aligned with the opening of the recess(es) 120, or slightly lower than the opening of the first recess(es) 120 (for example, 0.1 to 0.2 mm lower), such that, after embedding an information storage medium, a security feature, or other elements, the height of an embedded element is substantially aligned with an opening of the first recess(es) 120.

In an exemplary embodiment, the first information storage medium may include a contact information storage medium or a non-contact information storage medium, for example, at least one of a contact IC chip, a non-contact IC chip, a magnetic strip, and a signature strip. The first security feature may include one of various security features typically employed on a bank card, such as a laser anti-counterfeit label, an RFID (radio frequency identification) anti-counterfeit chip, a miniature text, and the like. The first decorative feature may include materials or features that can provide decorative effects on the surface of the card body, such as hot stamping images, metal foils of special colors, plating, and the like.

Figure 2:
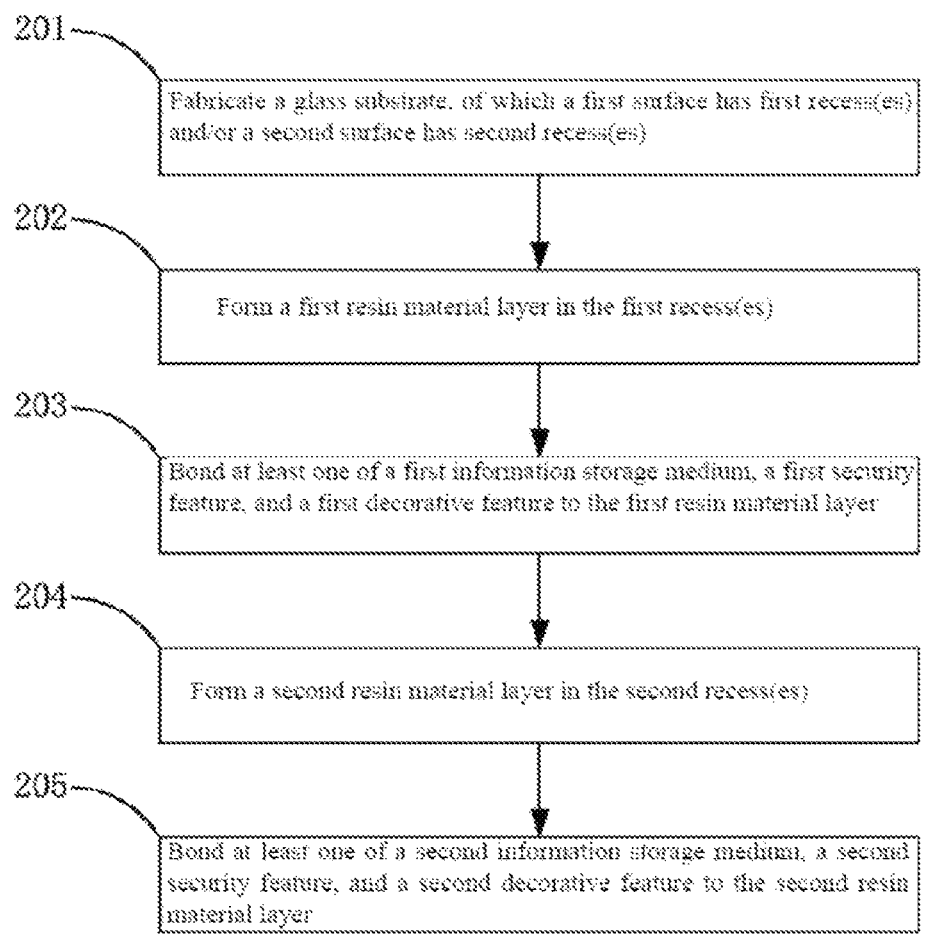
FIG. 2 is a flow chart of a method of fabricating an identification card with a glass substrate in accordance with an exemplary embodiment of the present invention.

Further, as shown in FIG. 2, the second surface 112 of the glass substrate 110 of the identification card 100 is provided with at least one second recess 130 similar to the first recess(es) 120, and the identification card 100 further includes a second resin material layer 131 filled in the second recess(es) 130 and a second information storage medium 132 bonded to the second resin material layer.

The second resin material layer 131 may be formed of the same or different material as the first resin material layer 121. In the exemplary embodiment, the first resin material layer 121 and the second resin material layer 131 are each formed of a PVC material in the same process. Similarly, the height of the second resin material layer 131 may be substantially aligned with the opening of the second recess(es) 130 or slightly lower than the opening of the second recess(es) 130 (for example, 0.1 to 0.2 mm lower) such that, after embedding an information storage medium or other elements, the height of an embedded element is substantially aligned with the opening of the second recess(es) 130.

In an exemplary embodiment, the second information storage medium, the second security feature, and the second decorative feature are respectively the same classes of features as the first information storage medium, the first security feature, and the first decorative feature, and may be the same or different.

It should be noted that, when viewed from the front side or the reverse side of the identification card, the first recess(es) or the second recess(es) on the surface of the glass substrate may be of the same or different surface shapes, and each of the first recess(es) or the second recess(es) may be of different shapes, for example, rectangular shape, circular shape, elliptical shape, and the like.

In addition, the identification card may further have an ink layer formed on the surface of the glass substrate or the first/second resin material layer by methods of printing or the like for providing a personalized pattern, other related information of the identification card (for example, card issuer information, card number), and the like.

According to another aspect of the invention, there is also provided a method of manufacturing such an identification card with a glass substrate. FIG. 2 shows a schematic flow chart for manufacturing such an identification card in accordance with an embodiment of the present invention.

As shown, the method of manufacturing an identification card with a glass substrate may include the following steps.

In step 201, a glass substrate is first fabricated such that the first surface of the glass substrate has first recess(es) and/or the second surface has second recess(es).

The glass substrate may be made by a glass material such as a silicate glass, a borate glass, a phosphate glass or the like having a suitable strength, or a glass composite. The glass substrate may also be made by a suitably treated glass material for better physical properties, or a glass-based composite may also be used to make the glass substrate. An appropriate amount of other components may also be incorporated into the glass raw material to impart a desired color, light transmittance, and/or infrared transmittance to the glass substrate.

The glass substrate may be made by melting a glass raw material at a high temperature and then injecting it into a suitable mold for casting. The recess(es) on the surface of the glass substrate may be formed while manufacturing the glass substrate by using a suitable casting mold. According to the need, a suitable number and shape of the recess(es) may be formed on only one surface of the glass substrate, or a suitable number and shape of recess(es) may be simultaneously formed on the opposite surfaces of the glass substrate.

In step 202, a first resin material layer is formed in the first recess(es). The first resin material layer may be formed of at least one of various commonly used resin materials such as PET, PVC, ABS, PP, PE, and the like. After the glass substrate is completed, the resin material may be injected into the first recess(es) of the glass substrate in a molten state, and then cooled to form a first resin material layer. Further, the height of the first resin material layer may be substantially aligned with the opening of the first recess(es) or slightly lower than the opening of the first recess(es) (for example, 0.1 to 0.2 mm lower) such that, after embedding an information storage medium, a security feature and the like, the height of an embedded element is substantially aligned with the opening of the first recess(es).

In step 203, at least one of a first information storage medium, a first security feature, and a first decorative feature is bonded to the first resin material layer.

The first information storage medium (e.g., at least one of a contact IC chip, a non-contact IC chip, a magnetic strip, and a signature strip), a first security feature (e.g., a laser anti-counterfeit label, an RFID (Radio Frequency Identification) anti-counterfeit chip and the like) and the first decorative features (e.g., hot stamping images, metal foils of special colors, plating, etc.) may be bonded to the first resin material layer by the same or similar methods as conventional card making processes. In this way, it is possible to avoid the technical problem in the prior art that the information storage feature, the security feature, and the decorative feature cannot be well bonded to the glass material.

According to the need, if the recesses are formed on both opposite surfaces of the glass substrate, the method of manufacturing the identification card with the glass substrate may further include:

In step 204, forming a second resin material layer in the second recess(es).

In step 205, bonding at least one of a second information storage medium, a second security feature, and a second decorative feature to the second resin material layer.

The process or the means for implementing the steps 204 and 205 may be the same as the steps 202 and 203, respectively, and details are not described herein again.

Further, according to the specific structure of the various identification cards, after step 203 or step 205, the method may further include the step of forming an ink layer on the surface of the glass substrate or the first/second resin material layer for providing personalized patterns, other relevant information of the identification card (for example, card issuer information, card number), and the like.

Figure 3:
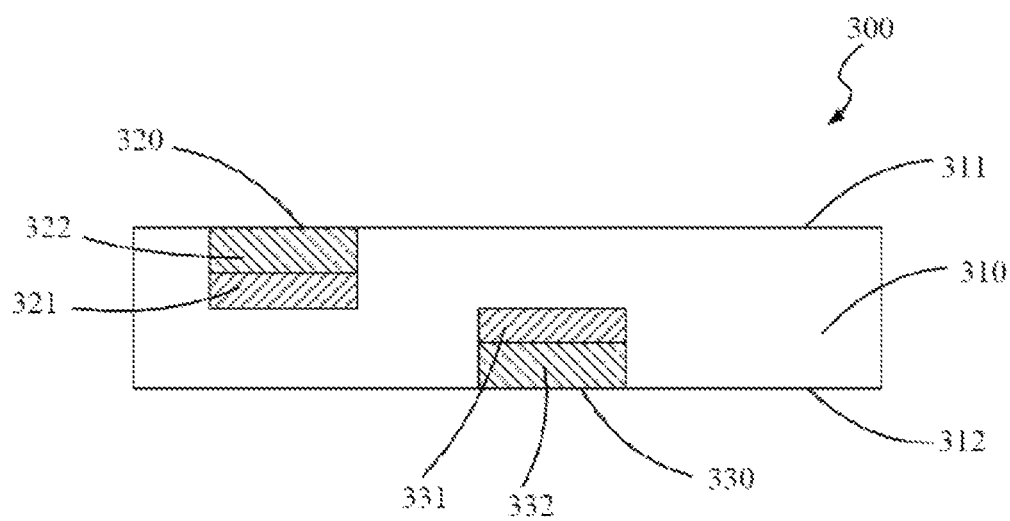
FIG. 3 is a schematic cross-sectional view of an identification card with a ceramic substrate in accordance with an exemplary embodiment of the present invention.

FIG. 3 is a schematic cross-sectional view of an identification card with a ceramic substrate in accordance with an exemplary embodiment of the present invention. As shown in FIG. 3, the identification card 300 includes a ceramic substrate 310, and the ceramic substrate 310 has a first surface 311 (e.g., a front side of the identification card) and a second surface 312 (e.g., the back side of the identification card) facing in opposite directions. At least one first recess 320 is formed on the first surface 311 of the ceramic substrate 310, and the identification card 300 further includes a first resin material layer 321 filled in the first recess(es) 320 and at least one feature 322 of a first information storage medium, a first security feature, and a first decorative feature bonded to the first resin material layer.

In an exemplary embodiment, the ceramic substrate 310 is made of a ceramic material. The ceramic material may include at least one or a mixture of a metal oxide, a metal carbide, a metal boride, a metal nitride, and a metal silicide. The ceramic substrate 310 may be made by melting a ceramic raw material at a high temperature and then injecting it into a suitable mold for casting. The first recess(es) 320 on the surface of the ceramic substrate 310 may be formed while the ceramic substrate 310 is being fabricated by using a suitable casting mold. Furthermore, the first recess(es) may also be obtained by machining after forming the ceramic substrate. Such identification card card has advantages of high melting point, high hardness, high wear resistance and oxidation resistance.

In an exemplary embodiment, the first resin material layer 321 may be formed of at least one of various commonly used resin materials, for example, polyethylene terephthalate (PET), polyvinyl chloride (PVC), acrylonitrile-butadiene-styrene copolymer (ABS), polypropylene (PP), polyethylene (PE), and the like. According to an exemplary embodiment, after the ceramic substrate 310 is completed, the resin material may be injected into the first recess(es) 320 of the ceramic substrate 310 in a molten state, and then be cooled to form a first resin material layer 321. An exemplary method of forming the first resin material layer 321 includes 3D printing. The height of the first resin material layer 321 may be substantially aligned with the opening of the recess(es) 320, or slightly lower than the opening of the first recess(es) 320 (for example, 0.1 to 0.2 mm lower), such that, after embedding an information storage medium, a security feature, or other elements, the height of an embedded element is substantially aligned with an opening of the first recess(es) 320.

In an exemplary embodiment, the first information storage medium may include a contact information storage medium or a non-contact information storage medium, for example, at least one of a contact IC chip, a non-contact IC chip, a magnetic strip, and a signature strip. The first security feature may include one of various security features typically employed on a bank card, such as a laser anti-counterfeit label, an RFID (radio frequency identification) anti-counterfeit chip, a miniature text, and the like. The first decorative feature may include materials or features that can provide decorative effects on the surface of the card body, such as hot stamping images, metal foils of special colors, plating, and the like.

Figure 4:
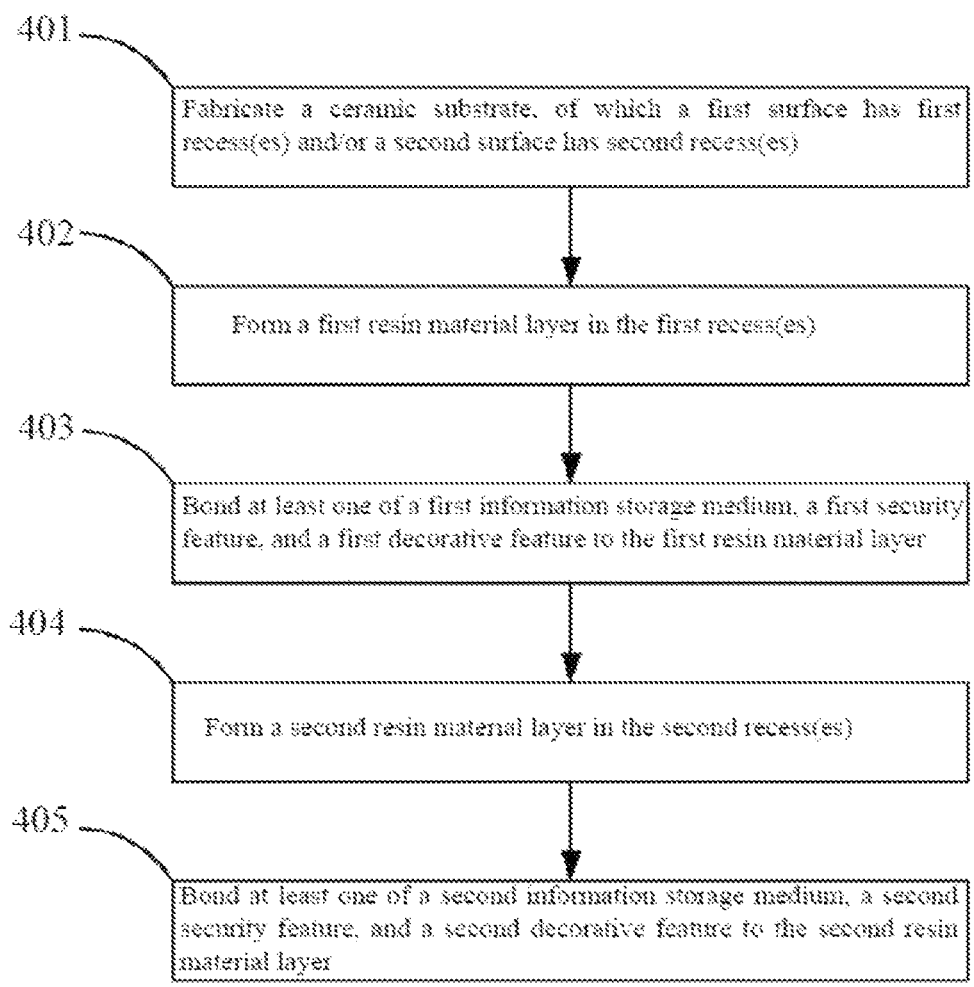
FIG. 4 is a flow chart of a method of fabricating an identification card with a ceramic substrate in accordance with an exemplary embodiment of the present invention.

Further, as shown in FIG. 4, the second surface 312 of the ceramic substrate 310 of the identification card 300 is provided with at least one second recess 330 similar to the first recess(es) 320, and the identification card 300 further includes a second resin material layer 331 filled in the second recess(es) 330 and a second information storage medium 132 bonded to the second resin material layer.

The second resin material layer 331 may be formed of the same or different material as the first resin material layer 321. In the exemplary embodiment, the first resin material layer 321 and the second resin material layer 331 are each formed of a PVC material in the same process. Similarly, the height of the second resin material layer 331 may be substantially aligned with the opening of the second recess(es) 330 or slightly lower than the opening of the second recess(es) 330 (for example, 0.1 to 0.2 mm lower) such that, after embedding an information storage medium or other elements, the height of an embedded element is substantially aligned with the opening of the second recess(es) 330.

In an exemplary embodiment, the second information storage medium, the second security feature, and the second decorative feature are respectively the same classes of features as the first information storage medium, the first security feature, and the first decorative feature, and may be the same or different.

It should be noted that, when viewed from a front side or a reverse side of the identification card, the first recess(es) or the second recess(es) on the surface of the ceramic substrate may be of the same or different surface shapes, and each of the first recess(es) or the second recess(es) may be of different shapes, for example, rectangular shape, circular shape, elliptical shape, and the like.

In addition, the identification card may further have an ink layer formed on the surface of the ceramic substrate or the first/second resin material layer by methods of printing or the like for providing a personalized pattern, other related information of the identification card (for example, card issuer information, card number), and the like.

According to another aspect of the invention, there is also provided a method of manufacturing such an identification card with a ceramic substrate. FIG. 4 shows a schematic flow chart for manufacturing such an identification card in accordance with an embodiment of the present invention.

As shown, the method of manufacturing an identification card with a ceramic substrate may include the following steps.

In step 401, a ceramic substrate is first fabricated such that the first surface of the ceramic substrate has the first recess(es) and/or the second surface has the second recess(es).

The ceramic substrate is made of a ceramic material. Available ceramic materials may include one of or a mixture of metal oxides, metal carbides, metal borides, metal nitrides, and metal silicides. The ceramic substrate may be made by melting a ceramic raw material at a high temperature and then injecting it into a suitable mold for casting. The recess(es) on the surface of the ceramic substrate may be formed while the ceramic substrate is being fabricated by using a suitable casting mold. According to the need, a suitable number and shape of recess(es) may be formed only on one surface of the ceramic substrate, or a suitable number and shape of recess(es) may be simultaneously formed on the opposite surfaces of the ceramic substrate.

In step 402, a first resin material layer is formed in the first recess(es). The first resin material layer may be formed of at least one of various commonly used resin materials such as PET, PVC, ABS, PP, PE, and the like. After the ceramic substrate is completed, the resin material may be injected into the first recess(es) of the ceramic substrate in a molten state, and then cooled to form a first resin material layer. Further, the height of the first resin material layer may be substantially aligned with the opening of the first recess(es) or slightly lower than the opening of the first recess(es) (for example, 0.1 to 0.2 mm lower) such that, after embedding an information storage medium, a security feature and the like, the height of an embedded element is substantially aligned with the opening of the first recess(es).

In step 403, at least one of a first information storage medium, a first security feature, and a first decorative feature is bonded to the first resin material layer.

The first information storage medium (e.g., at least one of a contact IC chip, a non-contact IC chip, a magnetic strip, and a signature strip), a first security feature (e.g., a laser anti-counterfeit label, an RFID (Radio Frequency Identification) anti-counterfeit chip and the like) and the first decorative features (e.g., hot stamping images, metal foils of special colors, plating, etc.) may be bonded to the first resin material layer by the same or similar methods as conventional card making processes. In this way, it is possible to avoid the technical problem in the prior art that the information storage feature, the security feature, and the decorative feature cannot be well bonded to the ceramic material.

According to the need, if the recesses are formed on both opposite surfaces of the ceramic substrate, the method of manufacturing the identification card with the ceramic substrate may further include:

In step 404, forming a second resin material layer in the second recess(es).

In step 405, bonding at least one of a second information storage medium, a second security feature, and a second decorative feature to the second resin material layer.

The process or the means for implementing the steps 404 and 405 may be the same as the steps 402 and 403, respectively, and details are not described herein again.

Further, according to the specific structure of the various identification cards, after step 403 or step 405, the method may further include the step of forming an ink layer on the surface of the ceramic substrate or the first/second resin material layer for providing personalized patterns, other relevant information of the identification card (for example, card issuer information, card number), and the like.

Heretofore, the preferred embodiments of the present invention have been described in detail by way of example, but those skilled in the art will recognize that further modifications and changes may be made without departing from the spirit of the invention, and all such modifications and changes are intended to fall within the scope of the present invention. Therefore, the scope of the invention should be determined by the scope of the appended claims.

The invention claimed is:

1. An identification card comprising:
a card body having a first side and a second side, the card body comprising a glass substrate with a first surface and a second surface facing in opposite directions;
wherein the first surface of the glass substrate extends to the first side of the card body and the second surface of the glass substrate extends to the second side of the card body;
wherein the first surface of the glass substrate has at least one first recess; and
the identification card further includes:
a first resin material layer filled in the at least one first recess; and
at least one of a first information storage medium, a first security feature, and a first decorative feature bonded to the first resin material layer;
wherein the height of the first resin material layer is substantially aligned with or up to 0.2 mm lower than the first surface of the glass substrate.

2. The identification card according to claim 1, wherein the glass substrate comprises a silicate glass, a borate glass, a phosphate glass or a glass composite.

3. The identification card according to claim 1, wherein, the second surface of the glass substrate has at least one second recess, and the identification card further comprises:
a second resin material layer filled in the at least one second recess; and
at least one of a second information storage medium, a second security feature, and a second decorative feature bonded to the second resin material layer.

4. The identification card according to claim 3, wherein:
the second resin material layer comprises at least one of PET, PVC, ABS, PP, and PE; and
the second information storage medium comprises at least one of a contact IC chip, a non-contact IC chip, a magnetic strip, and a signature strip.

5. The identification card according to claim 1, wherein:
the first resin material layer comprises at least one of PET, PVC, ABS, PP, and PE; and
the first information storage medium comprises at least one of a contact IC chip, a non-contact IC chip, a magnetic strip, and a signature strip.

6. An identification card comprising:
a card body having a first side and a second side, the card body comprising a ceramic substrate with a first surface and a second surface facing in opposite directions;
wherein the first surface of the ceramic substrate extends to the first side of the card body and the second surface of the ceramic substrate extends to the second side of the card body;
wherein the first surface of the ceramic substrate has at least one first recess; and
the identification card further includes:
a first resin material layer filled in the at least one first recess; and
at least one of a first information storage medium, a first security feature, and a first decorative feature bonded to the first resin material layer;
wherein the height of the first resin material layer is substantially aligned with or up to 0.2 mm lower than the first surface of the ceramic substrate.

7. The identification card according to claim 6, wherein the ceramic substrate comprises at least one of a metal oxide, a metal carbide, a metal boride, a metal nitride, and a metal silicide.

8. The identification card according to claim 6, wherein, the second surface of the ceramic substrate has at least one second recess, and the identification card further comprises:
a second resin material layer filled in the at least one second recess; and
at least one of a second information storage medium, a second security feature, and a second decorative feature bonded to the second resin material layer.

9. A method of manufacturing an identification card with a glass or ceramic substrate, comprising:
fabricating a glass or ceramic substrate with a first surface and a second surface facing in opposite directions, wherein the first surface of the glass or ceramic substrate extends to a first side of the identification card and the second surface of the glass or ceramic substrate extends to a second side of the identification card;
wherein the first surface of the glass or ceramic substrate has at least one first recess;
wherein the at least one first recess is formed while fabricating the glass or ceramic substrate by using a casting mold;
forming a first resin material layer in the at least one first recess; and
bonding at least one of a first information storage medium, a first security feature, and a first decorative feature to the first resin material layer;
wherein the height of the first resin material layer is substantially aligned with or up to 0.2 mm lower than the first surface of the glass or ceramic substrate.

10. The method according to claim 9, wherein the glass or ceramic substrate comprises a silicate glass, a borate glass, a phosphate glass or a glass composite.

11. The method according to claim 9, wherein, the second surface of the glass or ceramic substrate has at least one second recess, and the method further comprises:
forming a second resin material layer in the at least one second recess; and
bonding at least one of a second information storage medium, a second security feature, and a second decorative feature to the second resin material layer.

12. The method according to claim 11, wherein the glass or ceramic substrate comprises at least one of a metal oxide, a metal carbide, a metal boride, a metal nitride, and a metal silicide.

13. The method according to claim 9, wherein:
the first resin material layer comprises at least one of PET, PVC, ABS, PP, and PE; and
the first information storage medium comprises at least one of a contact IC chip, a non-contact IC chip, a magnetic strip, and a signature strip.

14. The method according to claim 11, wherein:
the second resin material layer comprises at least one of PET, PVC, ABS, PP, and PE; and
the second information storage medium comprises at least one of a contact IC chip, a non-contact IC chip, a magnetic strip, and a signature strip.

* * * * *